United States Patent [19]

Seyler

[11] Patent Number: 4,830,348

[45] Date of Patent: May 16, 1989

[54] NOISE SUPPRESSING DEVICE FOR COIL SPRINGS

[75] Inventor: Peter G. Seyler, Franklin Park, Ill.

[73] Assignee: Perfection Spring & Stamping Corp., Mt. Prospect, Ill.

[21] Appl. No.: 157,367

[22] Filed: Feb. 17, 1988

Related U.S. Application Data

[63] Continuation-in-part of Ser. No. 1,399, Jan. 8, 1987, abandoned.

[51] Int. Cl.$^4$ ............................................. F16F 1/06
[52] U.S. Cl. .................................... 267/166; 267/136; 267/204; 267/287
[58] Field of Search ............... 267/204, 286, 287, 196, 267/136, 182, 166; 5/253, 261, 309; 181/207, 208, 209

[56] References Cited

U.S. PATENT DOCUMENTS

| | | | |
|---|---|---|---|
| 1,988,295 | 1/1935 | Berry | 267/286 X |
| 2,042,647 | 6/1936 | Wine | 267/204 |
| 2,436,163 | 2/1948 | Christenson | 267/204 |
| 2,703,234 | 3/1955 | Tapp | 267/287 X |
| 3,326,545 | 6/1967 | Bache et al. | 267/287 |
| 4,614,333 | 9/1986 | Gaylord | 267/287 |

FOREIGN PATENT DOCUMENTS

85/04227 9/1985 World Int. Prop. O. .......... 267/136

*Primary Examiner*—Andres Kashnikow
*Assistant Examiner*—Richard Potosnak
*Attorney, Agent, or Firm*—Tilton, Fallon, Lungmus

[57] ABSTRACT

A noise suppressing device for a coil spring, and the combination of a spring equipped with such a device, in which the noise suppressing device takes the form of at least one spring metal sleeve of arcuate C-shaped cross section extending about and tightly engaging a portion of the spring intermediate the length thereof. A lug portion of the sleeve projects into the spacing between a pair of adjacent coils and limits the extent of sliding movement of the sleeve along such coils as the spring expands and contracts.

13 Claims, 2 Drawing Sheets

NOISE SUPPRESSING DEVICE FOR COIL SPRINGS

RELATED APPLICATION

This application is a continuation-in-part of copending application Ser. No. 1,399, filed Jan. 8, 1987, now abandoned.

BACKGROUND AND SUMMARY

The trunk lids of many modern automobiles are counterbalanced by tension coil spring assemblies located within the trunk compartments of such vehicles. When the trunk lid of such vehicle is closed, the springs (ordinarily two, one on each side of the vehicle) are in stretched or tensioned condition. It has been observed that under such conditions, if any one of the passenger doors is firmly closed, the counterbalancing springs will vibrate causing an objectionable ringing or zinging sound. Such a sound tends to be transmitted throughout the vehicle body which functions as a sounding board.

Efforts to prevent or limit such free vibration of the tensioned springs when a vehicle's doors are closed (or when the vehicle is impacted in any other way as, for example, by closing the engine compartment lid or hood) have in the past been only partially successful at best. Thus, sound-dampening coating materials have been applied to such springs without producing any appreciable diminution of the ringing sound when such a spring is caused to vibrate. Rubber wedges have been fitted between such a spring and its connection to the auto body but with uneven results. In some cases the ringing sound is found to be diminished when the vehicle doors are forceably closed but such a sound is still generated when the trunk lid is opened, or closed, or both. A further disadvantage to such rubber parts is that such parts cannot be pre-mounted on the counterbalancing spring assembly, or cannot be put in place at the time the spring assemblies are attached, because at such a stage in the manufacture of the vehicle further painting and baking of the body are required. In general, such rubber components are incapable of withstanding the elevated temperatures used for baking automotive finishes.

An important aspect of this invention therefore lies in the discovery that suppressing the free vibration of a tensioned coil spring may be effectively accomplished by utilizing a second spring metal element in the form of a C-shaped sleeve that is coaxial with the coil spring and that tightly embraces an intermediate portion of that coil spring. Ideally, two such sleeves are used for each coil spring of a typical counterbalancing assembly for a vehicle trunk lid, and a greater number of sleeves may be used in other applications where coil springs of greater length are utilized. Such a sleeve may be easily snapped in place and, because of its spring metal construction, may easily withstand the elevated temperatures encountered in subsequent painting or other manufacturing steps. Stop means in the form of a lug portion projecting from the inner surface of the sleeve limits the extend of longitudinal sliding movement of the sleeve along the spring on which it is mounted.

The C-shaped sleeve is of circumferentially-interrupted cylindrical shape; that is, its inner and outer surfaces would be generally cylindrical if it were not for the longitudinal slit or opening that circumferentially interrupts such surfaces. The sleeve has an axial length substantially less than that of the coil spring extending through it. In general, the length of the spring sleeve is only a minor portion of the length of the coil spring in an untensioned state and, ideally, the length of the sleeve is no greater than its outside diameter (when untensioned). However, the sleeve must have an axial length equal at least to the axial length of one full coil of the spring when that spring is in its maximum state of tension in normal use. Also, when the spring-metal sleeve is in an undeformed state, its inside diameter should be appreciably less than the outside diameter of the cylindrical coil spring. In general, the sleeve should have an inside diameter within the range of 5 to 8% smaller than the outside diameter of the coil spring in an untensioned state. The angular dimension of the arcuate C-shaped spring should fall within the general range of 270° to 310°, a preferred range being approximately 280° to 300°.

Other features, advantages, and objects of the invention will become apparent from the specification and drawings.

DRAWINGS

DETAILED DESCRIPTION OF PREFERRED EMBODIMENT

Figure 1:
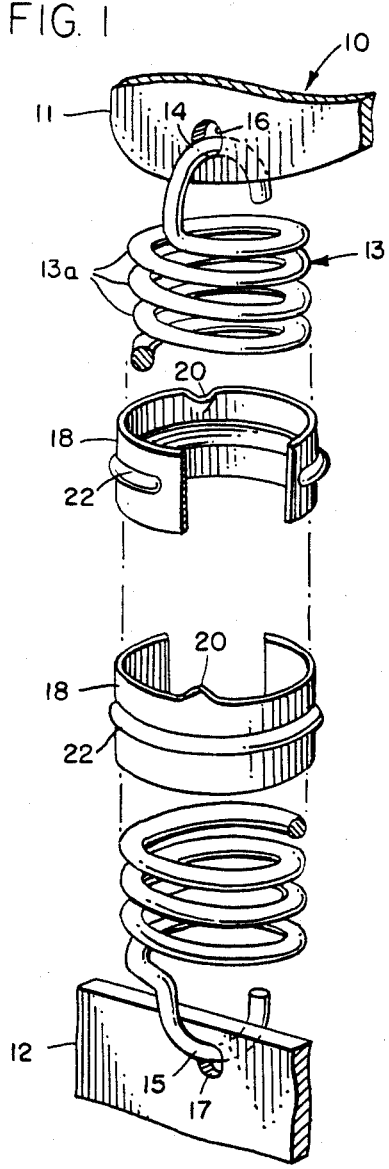
FIG. 1 is a perspective view of an assembly equipped with a pair of noise-suppressing sleeves embodying the present invention.

Referring to the drawings, and particularly of FIG. 1, the numeral 10 generally designates a counterbalancing assembly comprising a movable member 11 such as, for example, a hinged trunk lid, a stationary member 12, such as a portion of a vehicle body shell, a tension coil spring 13 having its end portions 14 and 15 connected to members 11 and 12, as by being hooked through openings 16 and 17, and a pair of noise-suppressing devices 18. Since the tension spring performs a counterbalancing function, it assumes the stretched condition shown in FIG. 1 when the lid 11 is closed. In its tensioned state, it exerts a downward pulling force which then counterbalances the weight of the hinged lid when the lid is unlatched and raised.

The coil spring 13 is generally cylindrical in configuration and has a multiplicity of coils 13a of equal size. When the spring is in a substantially relaxed or untensioned state (i.e., when the lid is fully raised), coils 13a are spaced close to each other, as depicted most clearly in FIG. 6. For simplicity of illustration, spring 13 is shown as having its end portions hooked through openings 16 and 17 of the sprung and unsprung components of the vehicle; however, it is to be understood that other means of attachment may be used. Reference may be made to U.S. Pat. Nos. 4,429,179 and 4,549,325 for details of an internal nut construction useful for connecting the ends of counterbalancing springs so that the tension of such springs may be selectively adjusted during manufacture and at later times.

Figure 4:
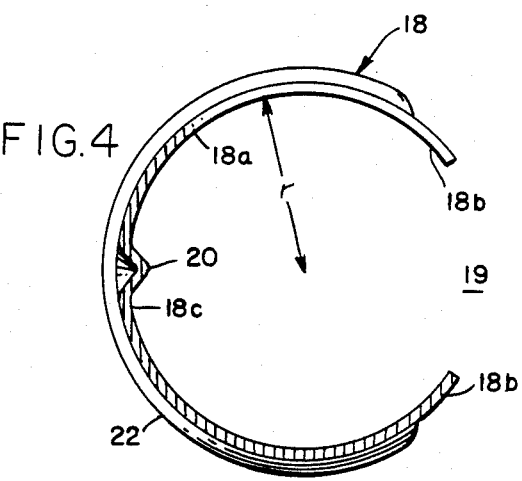
FIG. 4 is a top plan view.

Each spring sleeve 18 has inner and outer surfaces of circumferentially-interrupted cylindrical shape. More specifically, each sleeve 18 is C-shaped in plan and in transverse cross section, with inner and outer surfaces each of generally uniform curvature when the sleeve is in its untensioned or undeformed state. In terms of length, the sleeve has an axial length substantially less than that of spring 13. As shown in the drawings, the sleeve's length is only a minor portion of the length of the coiled portion of the unstretched or untensioned spring 13. Particularly effective results have been obtained where the length of the sleeve is no greater than its outside diameter in an untensioned state. However, the sleeve must have an axial length equal to at least the axial length of one full coil of spring 13 when that spring is fully tensioned in normal use. If measured when the spring is untensioned, the length of the sleeve should be at least two or three coils; in FIG. 6, the sleeve is shown to have a length "1" approximating the axial length of four such coils. Also, in a preferred form of the invention, length "1" should be approximately as great, or even greater, than the inside radius "r" of the sleeve in an untensioned state (FIG. 4).

It is important that the inside diameter of the sleeve be smaller than the outside diameter of the spring when the sleeve is untensioned and the spring is tensioned (or untensioned). In general, the sleeve should have an inside diameter approximately 5 to 8% smaller than the outside diameter of the untensioned spring. The result is that when the sleeve 18 is fitted about spring 13, it tightly engages a portion of the spring's outer surface whether the spring is stretched or unstretched. It has been found that the force of such engagement is not uniformly distributed along the inner surface 18a of the sleeve because the sleeve, as it is forced to accommodate the spring, expands into an out-of-round cross sectional configuration shown in somewhat exaggerated form in FIG. 5. Contact between the sleeve and spring tends to occur more forcefully along side edge portions 18b and mid portion 18c spaced equidistant from the side edge portions. While such unequalized clamping forces may not significantly enhance the noise-suppressing action of the sleeve, the greater unit force exerted by the side edge portions 18b is believed to contribute in preventing rotation of the sleeve upon the spring in use of the assembly.

Figure 5:
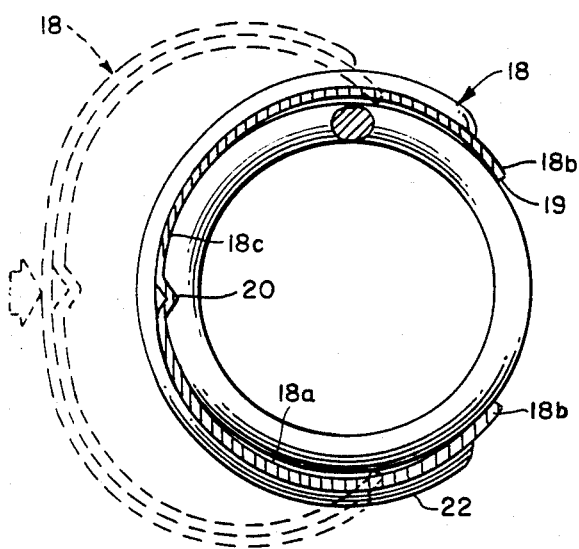
FIG. 5 is an enlarged and somewhat schematic cross sectional view of a spring showing a noise-suppressing sleeve mounted thereon and also showing (in broken lines) the manner of securing such a sleeve in place.

The side edge portions 18b are spaced apart to define an opening 19 through which the spring may be forcably inserted, accompanied by momentary expansion of the spring metal sleeve as indicated in broken lines in FIG. 5. In its untensioned state, the arcuate sleeve 18 of incomplete cylindrical shape should have an angular dimension within the range of 270° to 310°, leaving an opening 19 having an angular dimension within the range of 50° to 90°. Preferably, the angular dimension of the sleeve should fall within the range of 280° to 300°, the optimum angular dimension being thought to be approximately 290°. Such angular dimensions insure that the spring metal sleeve may be forced laterally or radially onto a spring 13 and, because of the limited width of opening 19, will remain in place on the spring.

Figure 2:
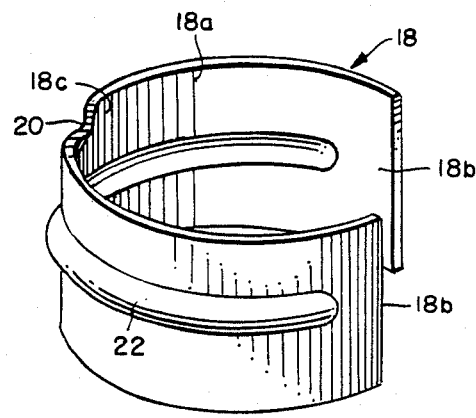
FIG. 2 is an enlarged perspective view of a noise-supressing sleeve.
Figure 3:
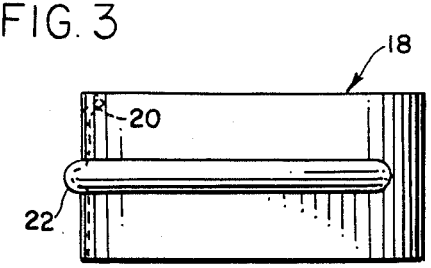
FIG. 3 is a side elevational view.
Figure 6:
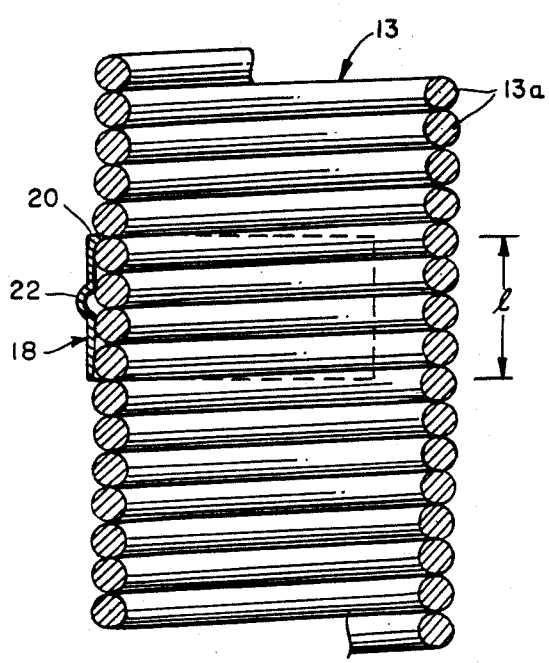
FIG. 6 is a longitudinal sectional view showing the combination of a spring and noise-suppressing device with the spring in an untensioned state.
Figure 7:
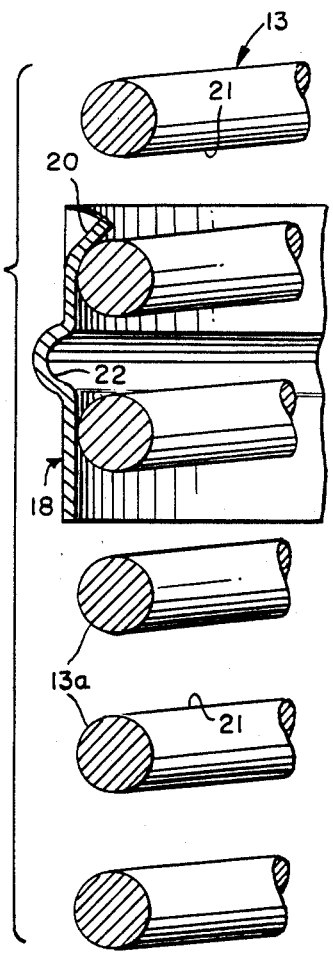
FIG. 7 is an enlarged fragmentary longitudinal sectional view similar to FIG. 6 but showing the spring in a tensioned state.

As shown most clearly in FIGS. 2 and 7 the edge at one end of the sleeve is deformed to provide stop means for limiting the extent of axial sliding movement of the sleeve along the spring 13. A portion of the edge equidistant from side edges 18b is deformed or deflected inwardly to produce an inwardly-projecting lug 20 that protrudes into the space 21 between a pair of adjacent coils 13a (FIG. 7). The lug prevents axial movement when the spring is relaxed or untensioned (FIG. 6). As the spring is forced to expand, however, its coils 13a separate and must slide axially in relation to sleeve 18. Lug 20 insures that the extent of axial sliding movement of the sleeve 18 in relation to spring 13 will not exceed the spacing between adjacent coils, as measured when the spring is in its expanded or tensioned state.

Sleeve 18 may be formed of any suitable spring metal although spring steel is preferred. Effective results have been obtained using spring steel of approximately 0.56 millimeters in thickness heat treated to a reading of 43 to 48 on the Rcokwell C scale. Material of that thickness is most effective for use with a spring 13 having an outside diameter in an untensioned state within the range of 33 to 34 millimeters, the sleeve in an untensioned state having an inside diameter of approximately 31 millimeters. It should also be noted that such thickness has been found effective where the sleeve is provided with an integral, arcuate, outwardly projecting stiffening rib 22 extending from one side edge portion 18b to the other side edge portion of the sleeve along a line mid way between the ends of the sleeve. Should rib 22 be omitted, a greater thickness of spring material for sleeve 18 may be required in order to produce comparable holding or gripping forces.

The precise reasons for the high degree of effectiveness of the sleeve as a noise-suppressing device for a tension coil spring may not be fully understood, especially in view of the fact that the sleeve itself is formed of spring metal and, if supported in a manner allowing free vibration, would produce a ringing sound upon impact in essentially the same manner as a tuning fork. It is believed, however, that the sleeve 18 functions as a damper of the dry-friction type with a damping force of constant magnitude independent of amplitude and frequency. The amplitude displacement for the free vibraations of coil spring 13 subjected to such dry-friction damping decreases at a constant rate. The energy (vibration) is absorbed by the friction created by the sleeve which clamps tightly about the outside surface of the spring. Such absorbed energy is, therefore, no longer available for producing the objectionable noise.

A substantial reduction in the ringing or zinging sound that would otherwise result from free vibration of coil spring 13 is achieved by using a single sleeve 18 of the material and construction disclosed herein. Particularly effective results are achieved where two such sleeves are mounted in spaced relation on a single spring as indicated in FIG. 1. While two sleeves have been found to eliminate all problems of objectionable ringing when used with a trunk lid counterbalancing coil spring of standard size (as widely used in vehicles of domestic manufacture), it is believed that a greater number of such sleeves might be useful in applications where the coil springs involved are of substantially greater length.

While in the foregoing, I have disclosed an embodiment of the invention in considerable detail for purposes of illustration, it will be understood by those skilled in the art that many of these details may be varied without departing from the spirit and scope of the invention.

I claim:

1. In combination, a tension coil spring having a longitudinal axis and having a coiled portion of generally cylindrical configuration with a multiplicity of coils of equal size; a spring metal sleeve of arcuate C-shaped transverse cross section coaxial with said spring and having an axial length constituting a minor portion of the length of said coiled portion of said spring but being at least equal to the axial length of one full coil of said spring when said spring is in tensioned state in normal use; said sleeve in an unexpanded, untensioned state having an inside diameter less than the outside diameter of said spring and being disposed externally about said coiled portion of said spring intermediate the length thereof and in tight frictional engagement therewith; said sleeve having a pair of generally longitudinally-extending side edges spaced apart to define a spring-insertion opening therebetween and said sleeve being constructed and arranged for radially-directed attachment of said sleeve to said spring through said opening without expansion of said sleeve beyond its elastic limit; said sleeve also having substantially its entire inner surface disposed at or beyond the outermost radial limits of said cylindrical coiled portion of said spring; and said side edges of said sleeve projecting beyond a longitudinal axial plane of said spring when said sleeve is fitted thereon.

2. The combination of claim 1 in which said sleeve includes a stop portion projecting inwardly into the spacing between adjacent coils to limit the extent of longitudinal sliding movement of said sleeve along said spring.

3. The combination of claims 1 or 2 in which said sleeve has an axial length no greater than its outside diameter in an untensioned state.

4. The combination of claims 1 or 2 in which said sleeve has an inside diameter 5 to 8% smaller than the outside diameter of said spring in an untensioned state.

5. The combination of claims 1 or 2 in which said sleeve has an axial length equal to at least two full coils of said spring in an untensioned state.

6. The combination of claim 5 in which said sleeve has an axial length equal to at least three full coils of said spring in an untensioned state.

7. The combination of claims 1 or 2 in which said longitudinal side edges are substantially parallel with said longitudinal axis of said spring; said sleeve having a cross-sectional angular dimension within the range of 270° to 310°.

8. The combination of claim 7 in which said sleeve has an angular dimension within the range of about 280° to 300°.

9. The combination of claim 8 in which said sleeve has an angular dimension of approximately 290°.

10. The combination of claims 1 or 2 in which said frictional engagement between said spring and said sleeve occurs along three primary zones of contact; two of said primary zones of contact being located along said side edges of said sleeve and the third primary zone of contact being disposed along said inner surface of said sleeve equidistant from said side edges.

11. The combination of claims 1 or 2 in which said sleeve includes an integral arcuate rib located intermediate the axial length of said sleeve and extending between said pair of side edges.

12. The combination of claims 1 or 2 in which a second sleeve identical to said first-mentioned sleeve is fitted about said coiled portion of said spring; said first and second sleeves being spaced apart from each other.

13. The combination of claim 12 in which said combination includes a pair of vehicle body elements connected to opposite ends of said spring; one of said elements being movable in relation to the other of said elements and being counterbalanced by the tensioning force of said spring.

* * * * *